US006452945B1

United States Patent
Upham et al.

(10) Patent No.: US 6,452,945 B1
(45) Date of Patent: Sep. 17, 2002

(54) ELECTRICAL ADD-DROP MULTIPLEXING FOR OPTICAL COMMUNICATIONS NETWORKS UTILIZING FREQUENCY DIVISION MULTIPLEXING

(75) Inventors: David B. Upham, Sunnyvale, CA (US); Augustus Elmer, San Jose, CA (US); Laurence J. Newell, Saratoga, CA (US); David A. Pechner, San Jose, CA (US); Abraham Kou, San Jose, CA (US); Michael W. Rowan, Los Gatos, CA (US); James F. Coward, La Honda, CA (US); Norman L. Swenson, Fremont, CA (US); Minnie Ho, Palo Alto, CA (US)

(73) Assignee: Kestrel Solutions, Inc., Mountain View, CA (US)

( * ) Notice: Subject to any disclaimer, the term of this patent is extended or adjusted under 35 U.S.C. 154(b) by 0 days.

(21) Appl. No.: 09/229,594

(22) Filed: Jan. 13, 1999

Related U.S. Application Data

(63) Continuation-in-part of application No. 09/035,630, filed on Mar. 5, 1998.

(51) Int. Cl.[7] .................................................. H04J 3/08
(52) U.S. Cl. ....................................... 370/480; 370/535
(58) Field of Search ................................ 370/480, 532, 370/535, 380; 359/117, 123; 340/2.28

(56) References Cited

U.S. PATENT DOCUMENTS

| 4,061,577 A | | 12/1977 | Bell ........................... 250/199 |
|---|---|---|---|
| 4,701,904 A | | 10/1987 | Darcie ........................... 370/3 |
| 4,704,715 A | * | 11/1987 | Shibagaki et al. ........... 370/307 |
| 4,953,156 A | | 8/1990 | Olshansky et al. ............. 370/3 |
| 5,018,135 A | * | 5/1991 | Ashi et al. .................... 370/535 |
| 5,111,323 A | * | 5/1992 | Tanaka et al. ............... 359/139 |
| 5,134,609 A | * | 7/1992 | Mori et al. .................. 370/380 |
| 5,311,501 A | * | 5/1994 | Takatsu ....................... 370/357 |
| 5,351,148 A | | 9/1994 | Maeda et al. ................ 359/124 |

(List continued on next page.)

FOREIGN PATENT DOCUMENTS

| EP | 0 717 521 A | 6/1996 |
|---|---|---|
| EP | 0 756 393 A1 | 1/1997 |

OTHER PUBLICATIONS

Sargis, Paul D., et al., "10–Gb/s Subcarrier Multiplexed Transmission Over 490 km of Ordinary Single–Mode Fiber Without Dispersion Compensation," *IEEE Photonics Letters*, vol. 9, No. 12 (Dec. 1997), pp. 1658–1660.

(List continued on next page.)

*Primary Examiner*—Min Jung
(74) *Attorney, Agent, or Firm*—Fenwick & West LLP

(57) ABSTRACT

A frequency division multiplexing (FDM) node used in optical communications networks provides add-drop multiplexing (ADM) functionality between optical high-speed channels, and low-speed tributaries. The FDM node includes a high-speed system and an ADM crosspoint. The high-speed system converts between an optical high-speed channel and its constituent electrical, low-speed channels through the use of frequency division multiplexing. The ADM crosspoint couples any incoming low-speed channels and any incoming tributaries to any outgoing low-speed channels and tributaries, thus implementing the ADM functionality for the FDM node.

33 Claims, 5 Drawing Sheets

U.S. PATENT DOCUMENTS

| | | | |
|---|---|---|---|
| 5,387,927 A | | 2/1995 | Look et al. .................... 348/6 |
| 5,430,568 A | | 7/1995 | Little et al. ................. 359/124 |
| 5,461,612 A | | 10/1995 | Göckler et al. ............... 370/55 |
| 5,559,561 A | | 9/1996 | Wei ............................ 348/470 |
| 5,576,874 A | | 11/1996 | Czerwiec et al. ........... 359/123 |
| 5,596,436 A | | 1/1997 | Sargis et al. ................ 359/132 |
| 5,680,238 A | | 10/1997 | Masuda ....................... 359/132 |
| 5,896,387 A | * | 4/1999 | Fujita et al. ................ 370/359 |
| 5,930,231 A | | 7/1999 | Miller et al. ................ 370/210 |
| 6,078,412 A | | 6/2000 | Fuse et al. .................. 359/124 |
| 6,111,676 A | * | 8/2000 | Lemus et al. ............... 359/124 |
| 6,144,428 A | * | 11/2000 | Schadt et al. ............... 349/113 |
| 6,144,786 A | * | 11/2000 | Chethik ........................ 385/24 |
| 6,288,808 B1 | * | 9/2001 | Lee et al. .................... 359/123 |
| 6,335,810 B1 | * | 1/2002 | Uehara ........................ 359/127 |

OTHER PUBLICATIONS

Hill, Paul M., et al., "Multigigabit Subcarrier Multiplexed Coherent Lightwave System," *Journal of Lightwave Technology*, vol. 10, No. 11, Nov. 1992, pp. 1656–1664.

Schlump, Dieter et al.: "Electronic equalization of PMD and chromatic dispersion induced distortion after 100 km standard fibre at 10 Gbit/s" Proceedings of the European Conference on Optical Communication, Sep. 20, 1998, pp. 535–536.

Hiramatsu, A. et al., "Hypermedia Photonic Information Network Based on WDM–SCM Broadcast and Select Switching," Conference Proceedings, Leos '96 $9^{th}$ Annual Meeting, IEEE Lasers and Electro–Optics Society 1996 Annual Meeting (Cat. No. 96CH35895), Boston, MA, Nov. 18–19, 1996, pp. 312–313.

Nishikido, J. et al., "Multiwavelength Securely–Authenticated Broadcast Network" 11 $^{th}$ International Conference on Integrated Optics and Optical Fibre Communications, $23^{rd}$ European Conference on Optical Communications IOO-C–ECOC 97 (Conf. Publ. No. 448), Sep. 22, 1997, pp. 17–20.

Business Wire, "Harmonic Lightwaves Announces Availability of First MCNS–Compliant QAM Modulator; TRANsend QAM is a Vital Component for Delivering Digital Services", Nov. 18, 1997.

C. Tai, Pi–Yang Chiang, W. Way, "Eight–Way, 70–km Transmission of 33–Channel 64–QAM Signals Utilizing a 1.3–μm External Modulation System and Semiconductor Optical Amplifier", *IEEE Photonics Technology Letters*, vol. 8, No. 9, Sep. 1996, pp. 1244–1248.

D. Tang, "Multi–Gigabit Fiber–Optic Video Distribution Network Using BPSK Microwave Subcarriers", *IEEE 1989 MTT–S Intl. Microwave Symp Digest*, Jun. 13–15, 1989, Long Beach, CA, vol. 2, pp. 697–701.

E. Douverne, M. Ottka, K. Ruthermann, K. Siegel, "Ein 64–QAM–Modem für SDH–Richtfunkgeräte mit integriertem Kreuzpolarisationsentkoppler", vol. 40, No. 11, Mar. 1, 1994, pp. 89–100.

G Wilson, "Capacity of QAM SCM systems utilising optically linearised Mach–Zehnder modulator as transmitter", Electronic Letters, vol. 34, No. 25, Dec. 10, 1998, pp. 2372–2374.

H. Dai, C. Lin, M. Ramachandran, "Hybrid AM/QAM Video Trunking Lightwave Systems With Cascaded EDFAs", *Conf. Proc. LEOS, 97 Annual Meeting, IEEE Lasers& Electro Optic Society*, 1997, vol. 1, pp. 319–320.

H. Ohtsuka, O. Kagami, S. Aikawa, H. Takanashi, "256–QAM Subcarrier Transmission for Broadband Distribution Networks", NTT Radio Communications Systems Laboratories, GlobeCom '91, pp. 1817–1822.

J. LeBer, M. LeLigne, "Digital Transmission on Electric Subcarriers in Optical Fiber Videocommunication Systems", *Optics Communciations*, Oct. 15, 1987, vol. 64, No. 2, pp. 120–126.

J. Li, K. Yano, "Development of AM/QAM Hybrid Optical SCM Transmission System", *Proc Intl Conf. On Communication Technology ICCT '96*, May 5–7, 1996, Beijing, China, vol. 1, pp. 575–577.

J. Park, A. Elrefaie, K. Lau, "1550–nm Transmission of Digitally Modulated 28–GHz Subcarriers Over 77 km of Nondispersion Shifted Fiber", *IEEE Photonics Technology Letters*, Feb. 1997, vol. 9, Issue 2, pp. 256–258.

K. Ho, H. Dai, C. Lin, "Hybrid WDM Digital Trunking System for both HFC and FTTC Access Networks", Digest IEEE/LEOS 1996 Summer Topical Meetings (Cat. No. $96^{th}$ 8164), NY, NY, pp. 37–38.

M. Fuse, Y. Kudo, K. Maeda, "Development of 128 Optical Distribution System of 150 chs AM/QAM Hybrid Signals", *Electronics and Communications in Japan*, Nov. 1996, vol. 79, Issue 11, Part 1, pp. 65–77.

M. Kavehrad, E. Savov, "Fiber–Optic Transmission of Microwave 64–QAM Signals", IEEE Journal on Selected Areas in Communications, vol. 8, No. 7, Sep. 1990, pp. 1320–1326.

N. Kanno, K. Ito, "Fiber Optic Subcarrier Multiplexing Transport for Broadband Subscriber Distribution Network", *IEEE Intl. Conference on Communications Boston ICC/89 World Prosperity Through Communications*, Jun. 11–14, 1989, Boston, MA, vol. 2, pp. 996–1003.

P. Green, "Fiber Optic Networks", 1993, Prentice–Hall, Inc., Englewood Cliffs, New Jersey, p. 331, line 4–Line 7, figures 9–1.

V. Swaminathan, N. Froberg, L. Upadhyayula, "The end–to–end bit error performance of 64–quadrature amplitude modulated signals in a hybrid AM–vestigial sideband/QAM fiber–optic video transmission system", *Proceedings of SPIE–International Society for Optical Engineering*, vol. 2917, pp. 274–282.

X. Lu, G.E. Bodeep, T.E. Darcie, "Broad–Band AM–VSB/ 64 QAM Cable TV System Over Hybrid Fiber/Coax Network," IEEE Photonics Technology Letters, vol. 7, No. 4, Apr. 1995, pp. 330–332.

Y. Nakamura, H. Ohtsuka, S. Aikawa, H. Takanashi, "Advanced Techniques for Super Multi–Carrier Digital Microwave Radio With Trellis–Coded 256 QAM Modulation", NTT Radio Communication Systems Laboratories), pp. 389–394.

Cambrian Systems Corporation, "OPTera Metro Optical Networking Platform Product Information," copyright 1997 (printed from http://www.cambriansys.com/productinfo.htm on May 24, 1999), pp. 1–4.

Alcatel, "The OPTINEX Family of Network Elements", copyright 1997 (printed from http://www.alcatel.com/telecom/tsd/products/family.htm on May 24, 1999), pp. 1–7.

Alcatel, "Alcatel 1680 SM 10 Gbps (STM–64) Add Drop Multiplexer", copyright 1997 (printed from http://www.alcatel.com/telecom/mbd/products/products/1680sm.htm on May 24, 1999), pp. 1–4.

Alcatel, "Alcatel 1692 SM 10 Gbps (OC–192) SONET Transport System", copyright 1997 (printed from http://www.alcatel.com/telecom/mbd/products/products/1692.htm on May 24, 1999), pp. 1–2.

Fujitsu Network Communications, Inc., "Flash–192 Fujitsu Lightwave Add/Drop Multiplexer," copyright 1997 (printed from http;://www.fnc.fujitsu.com/technology/falsh192.htm on May 24, 1999), pp. 1–4.

Hitachi Telecom (USA) Inc., "OC–192 AMN5192 Sonet Node," Jul. 1998, pp. 1–2.

Nortel, "S/DMS Transport Node OC–192 System," Issue 1, Sep. 25, 1995, pp. 1–25.

I–Cube, "Optimal I/O Assignment in an IQX–based Crossbar Switch", Literature #D–21–019, Sep. 1997, pp. 1–14.

I–Cube, "IQX Family Data Sheet", Jan. 1999, pp. 1–58.

I–Cube, "Designing a Large Crosspoint With Fast Reconfiguration", Literature #D–22–013, Sep. 1997, pp. 1–9.

Ken–ichi Kitayama, "Subarrier Multiplexing Based Signaling and Access Control in Optical FDM Networks", IEEE Global Telecomuunications Conference (GLOBECOM'95, Singapore), Nov. 1995, pp. 1996–2002.

* cited by examiner

ELECTRICAL ADD-DROP MULTIPLEXING FOR OPTICAL COMMUNICATIONS NETWORKS UTILIZING FREQUENCY DIVISION MULTIPLEXING

CROSS-REFERENCE TO RELATED APPLICATION

This application is a continuation-in-part of pending U.S. patent application Ser. No. 09/035,630, "System and Method for Spectrally Efficient Transmission of Digital Data over Optical Fiber", by Michael W. Rowan, Roger R. Taur, Peter Chang, James F. Coward, Stuart Wilson, and Ting K. Yee, filed Mar. 5, 1998, (hereafter, referred to as the High-Speed System Application) which subject matter is incorporated herein by reference.

BACKGROUND OF THE INVENTION

1. Field of the Invention

This invention relates generally to the field of optical fiber communications. More specifically, the invention relates to the use of electrical crosspoints to implement the add/drop multiplexing (ADM) function in optical fiber communications systems using frequency-division multiplexing (FDM).

2. Description of the Related Art

As the result of continuous advances in technology, particularly in the areas of networking including the Internet, telecommunications, and application areas which rely on networking or telecommunications, there is an increasing demand for capacity for the transmission of digital data. For example, the transmission of digital data over a network's trunk lines (such as the trunk lines for telephone companies or for the Internet), the transmission of images or video over the Internet, the distribution of software, the transfer of large amounts of data as might be required in transaction processing, or videoconferencing implemented over a public telephone network typically requires the high speed transmission of large amounts of digital data. Typical protocols which are intended to support such transmissions include the SONET and SDH protocols. As applications such as the ones mentioned above become more prevalent, the use of these and similar protocols and the corresponding demand for transmission capacity will only increase.

Optical fiber is a transmission medium which is well-suited to meet this increasing demand for transmission capacity. Optical fiber has an inherent bandwidth which is much greater than metal-based conductors, such as twisted pair or coaxial cable, and protocols such as the OC protocol have been developed for the transmission of digital data over optical fibers.

However, because of its large inherent bandwidth, an optical fiber is most efficiently used when multiple users share the fiber. Typically, a number of low-speed data streams, for example transmitted by different users, are combined into a single high-speed channel for transport across the fiber. Similarly, when the high-speed channel reaches the destination for one of the low-speed data streams contained in it, the low-speed data stream must be extracted from the rest of the high-speed channel. The low-speed data streams shall be referred to as tributaries. Once multiple tributaries are combined into a high-speed channel, the corresponding portion of the high-speed channel shall be referred to as a "low-speed channel" that occupies a "low-speed slot" within the high-speed channel. Thus, a high-speed channel contains a number of low-speed slots, each of which may be occupied by a low-speed channel. Furthermore, each low-speed channel corresponds to a tributary, or possibly a group of tributaries.

A typical optical network consists of nodes which transmit high-speed channels to each other over optical fibers. The tributaries may be fed to and received from these nodes via a number of communications channels, including branch fibers, metal conductors, or even wireless communications channels. In addition to transporting low-speed channels through the node (the "pass-through" function), nodes typically also combine incoming tributaries to the high-speed channel (the "add" function) and extract outgoing tributaries from the high-speed channels (the "drop" function). These functions are commonly referred to as add-drop multiplexing (ADM).

Increasing the ADM functionality of the nodes in a network enhances both the applicability and the reliability of the network by increasing the number of applications, network configurations, and types of protection mechanisms that may be implemented by the network. For example, as described above, basic add, drop, and pass-through functionality supports the addition and extraction of tributaries to and from low-speed slots within high-speed channels. This enables a variety of network configurations, including point-to-point, linear chain, ring, and ring-to-ring configurations. More advanced ADM functionalities include drop-and-continue, in which a low-speed channel is both dropped as a tributary from one high-speed channel and continued on a low-speed slot of another high-speed channel; broadcast, in which a low-speed channel is dropped from a high-speed channel but then broadcast to multiple tributaries rather than just a single tributary; and multicast, in which a single tributary is added to multiple low-speed slots in one or more high-speed channels. These functionalities enable additional services, such as video and other Internet applications, to be deployed on top of the network configurations listed above. The added flexibility also facilitates the use of redundancy and the reconfiguration of the network with minimal disturbance to the on-going operation of the network.

However, the manner in which the ADM functionality is implemented in a particular network will depend in part on how the low-speed channels are combined to form a high-speed channel. Two widely used approaches to combining low-speed channels are wavelength division multiplexing (WDM) and time division multiplexing (TDM). In WDM, each low-speed channel is placed on an optical carrier of a different wavelength and the different wavelength carriers are combined to form the high-speed channel. Crosstalk between the low-speed channels is a major concern in WDM and, as a result, the wavelengths for the optical carriers must be spaced far enough apart (typically 50 GHz or more) so that the different low-speed channels are resolvable. In TDM, each low-speed channel is compressed into a certain time slot and the time slots are then combined on a time basis to form the high-speed channel. For example, in a certain period of time, the high-speed channel may be capable of transmitting 10 bits while each low-speed channel may only be capable of transmitting 1 bit. In this case, the first bit of the high-speed channel may be allocated to low-speed channel 1, the second bit to low-speed channel 2, and so on, thus forming a high-speed channel containing 10 low-speed channels. TDM requires precise synchronization of the different channels on a bit-by-bit basis (or byte-by-byte basis, in the case of SONET), and a memory buffer is typically also required to temporarily store data from the low-speed channels.

In the case of WDM, one approach is to implement the ADM functionality entirely in the optical domain. This avoids having to convert the high-speed channel from optical to electrical form, but has a number of other significant limitations. First, as described previously, the wavelengths for each of the optical carriers in a WDM system typically are spaced far apart (e.g. 50 GHz or more). As a result, the number of different optical carriers is limited and if each carrier corresponds to a tributary, as is typically the case, the total number of tributaries is also limited. Furthermore, if the bandwidth capacity of the fiber is to be used efficiently, each tributary must have a relatively high data rate due to the low number of tributaries, thus preventing add-drop at a fine granularity. For example, if the high-speed channel has a total capacity of 10 Gigabits per second (10 Gbps) and is allotted a bandwidth of 200 gHz, then current WDM systems will typically be limited to no more than four tributaries, each of which will be 2.5 Gbps in order to meet the overall bit rate of the high-speed channel. However, this means that the tributaries can only be added or dropped in blocks of 2.5 Gbps. Since many data streams occur at a much lower bit rate, such as at 155 Megabits per second (Mbps) for OC-3 tributaries, it is often desirable to add and drop at a granularity which is finer than what WDM can support.

The current state of technology also limits the practicality of all-optical ADM. In all-optical approaches, the channels typically are not regenerated as they pass through each node in the network and will continuously deteriorate until they reach their final destination. As a result, the entire network must be designed assuming deterioration along the worst-case path through the network. In contrast, if a channel is regenerated at each node, the network may be designed based only on node-to-node deterioration, regardless of the total number of nodes in the network. As another example, current technology makes it difficult to route a channel occupying a slot at one wavelength to a slot at a different wavelength. This severely limits the ADM functionality that may be implemented since each low-speed channel is not freely routable to any low-speed slot. For example, if a low-speed channel occupies a low-speed slot of a particular wavelength on an incoming high-speed channel, that low-speed channel can only be passed through to another high-speed channel if that channel's low-speed slot at that particular wavelength is unoccupied, regardless of how many other low-speed slots at other wavelengths are available.

An alternate approach to implementing ADM functionality for WDM systems is based on converting the optical high-speed channels to electrical form and then performing the ADM function electrically. This approach, however, is expensive since it requires significant amounts of both optical and electrical devices. WDM is an inherently optical approach and requires optical devices to implement. On the other hand, an electrical ADM would require significant electrical devices to implement. Combining the two would require both sets of devices and would additionally require optical-to-electrical (O/E) and electrical-to-optical (E/O) converters, typically one set for each wavelength used in the WDM.

As a result of the disadvantages described above, ADM capabilities in current WDM systems are often fixed or limited. For example, add/drop connections between tributaries and high-speed channels may be fixed when a node is installed and may be changed only by a corresponding change in hardware. As another example, the add/drop functions may be implemented only for a subset of the tributaries connected to a node. Alternately, a node may be able to implement only a subset of all possible connections between tributaries and high-speed channels. These compromises reduce the overall ADM functionality of the node and its flexibility within a network.

Implementing ADM capabilities for TDM networks also has significant disadvantages. First, as mentioned above, the TDM approach is strongly time-based and requires precise synchronization of the channels entering and exiting the ADM to a common reference clock. As a result, TDM systems require significantly more complex timing recovery, leading to increased overall cost. In addition, since the tributaries typically are combined on a bit-by-bit (or byte-by-byte) basis, TDM systems are heavily dependent on the bit rates of the individual tributaries and have difficulty handling tributaries of different bit rates. As yet another disadvantage, TDM systems generally require significant amounts of buffer memory since bits from the tributaries typically must be temporarily stored before they can be properly sorted and time-synchronized to form a high-speed channel. These required buffers add to the cost of implementing an ADM within a TDM system.

Thus, there is a need for an inexpensive node that provides a broad range of ADM capabilities for optical communications networks, in particular including the functionalities of adding, dropping, drop-and-continue, and pass-through of a low-speed channel to/from a low-speed slot to/from any other low-speed slot. The node preferably implements the ADM functionalities independent of bit rate, format, and protocol of the various channels. Furthermore, the node should be able to handle large numbers of fine granularity tributaries and in a spectrally-efficient manner. There is further a need for a node which regenerates the channels passing through it.

SUMMARY OF THE INVENTION

In accordance with the present invention, an FDM node for use in optical communications networks includes an O/E converter, a frequency division demultiplexer, an E/O converter, a frequency division multiplexer, and an ADM crosspoint. In the high-speed receive direction, the O/E converts a first optical high-speed channel to a first electrical high-speed channel. The frequency division demultiplexer is coupled to the O/E converter and frequency division demultiplexes the first electrical high-speed channel into a first plurality of low-speed channels. In the transmit direction, the frequency division multiplexer receives a second plurality of low-speed channels and frequency division multiplexes them into a second electrical high-speed channel, which is then converted by the E/O converter to a second optical high-speed channel. The ADM crosspoint has a plurality of low-speed inputs and low-speed outputs which are respectively coupled to the frequency division demultiplexer and frequency division multiplexer. The ADM crosspoint additionally has a plurality of tributary inputs and tributary outputs. The ADM crosspoint switchably couples any low-speed input to any low-speed output, any low-speed input to any tributary output, and any tributary input to any low-speed output, thus implementing an add/drop multiplexing (ADM) function for the optical high-speed channels.

This approach is particularly advantageous because the use of frequency division multiplexing results in the efficient combination of low-speed channels into a high-speed channel and the efficient separation of a high-speed channel into its constituent low-speed channels. For example, since the multiplexing occurs in the electrical domain rather than the optical one, this approach requires only a single optical to electrical conversion (e.g., the optical high-speed channel into an electrical high-speed channel), whereas approaches like WDM would require multiple optical to electrical conversions (e.g., one for each wavelength), with a corresponding increase in the equipment required. Furthermore, since the multiplexing occurs in the frequency domain rather than the time domain, this approach does not have stringent synchronization requirements and does not require memory buffers as would be the case with TDM approaches.

The efficient conversion between optical high-speed channels and electrical low-speed channels enables the use of an electrical ADM crosspoint to implement the ADM functionality of the FDM node. This yields further advantages since a crosspoint is more flexible than other ADM solutions. In particular, a crosspoint can be configured to connect any input to any output. As a result, in addition to the basic add, drop, and pass-through functions, the ADM crosspoint can implement any combinations of the above, including multicasting. This flexibility allows a single FDM node to be configured in a variety of ways to support a variety of network configurations. It also allows the FDM node to be easily reconfigured while in service. This facilitates the implementation of system reconfigurations with minimal disturbance to in-service traffic and also facilitates the implementation of fault-tolerance by enabling data streams to be efficiently re-routed to redundant hardware in the case of failure of the primary hardware.

In another aspect of the invention, a method for adding a tributary to an optical high-speed channel includes the following steps. The tributary is received at one of the tributary inputs of the ADM crosspoint. The crosspoint is configured to couple the tributary input to one of its low-speed outputs to produce a low-speed channel from the tributary. The low-speed channel is frequency division multiplexed with a plurality of other low-speed channels to produce an electrical high-speed channel, which is then converted to an optical high-speed channel.

In another aspect of the invention, a method for dropping a tributary from an optical high-speed channel includes the following steps. The optical high-speed channel is received and converted to an electrical high-speed channel, which is frequency division de-multiplexed into a plurality of low-speed channels, one of which includes the tributary to be dropped. The low-speed channel of interest is received at one of the low-speed inputs of the ADM crosspoint, which is configured to couple that low-speed input to one of the tributary outputs, thus producing the tributary at the tributary output.

In yet another aspect of the invention, a method for passing a low-speed channel included in a first optical high-speed channel through to a second optical high-speed channel includes the following steps. The first optical high-speed channel is received and converted to a first electrical high-speed channel, which is frequency division de-multiplexed into a plurality of low-speed channels. One of the low-speed channels is to be passed-through to a second optical high-speed channel. The low-speed channel of interest is received at one of the low-speed inputs of the ADM crosspoint. The crosspoint is configured to couple that low-speed input to one of the low-speed outputs to produce a second low-speed channel at the low-speed output. The second low-speed channel is frequency division multiplexed with a plurality of other low-speed channels to produce a second electrical high-speed channel, which is then converted to optical form producing the second optical high-speed channel.

BRIEF DESCRIPTION OF THE DRAWING

The invention has other advantages and features which will be more readily apparent from the following detailed description of the invention and the appended claims, when taken in conjunction with the accompanying drawing, in which:

DETAILED DESCRIPTION OF THE PREFERRED EMBODIMENTS

Figure 1C:
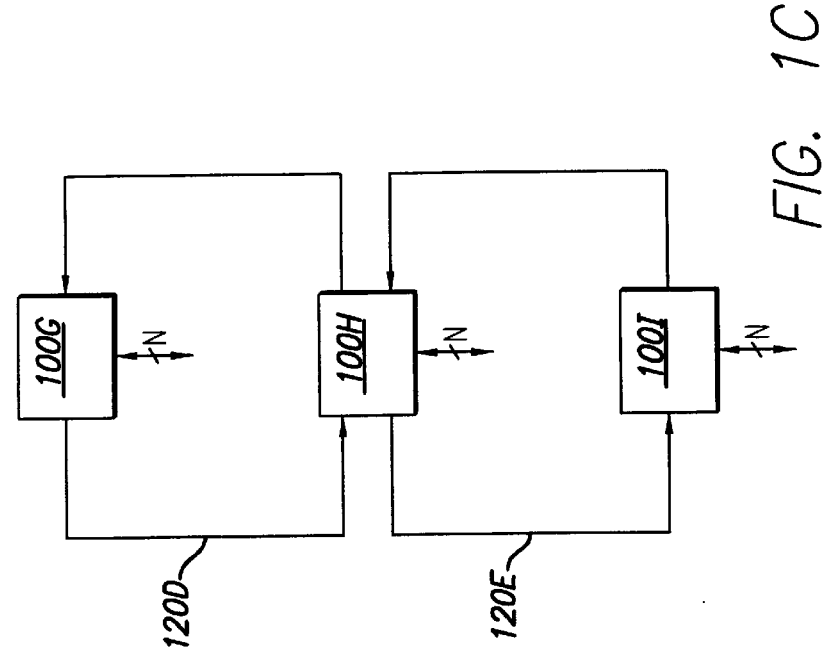
FIGS. 1A–1C are block diagrams of example optical communication networks including the present invention.
Figure 1A:
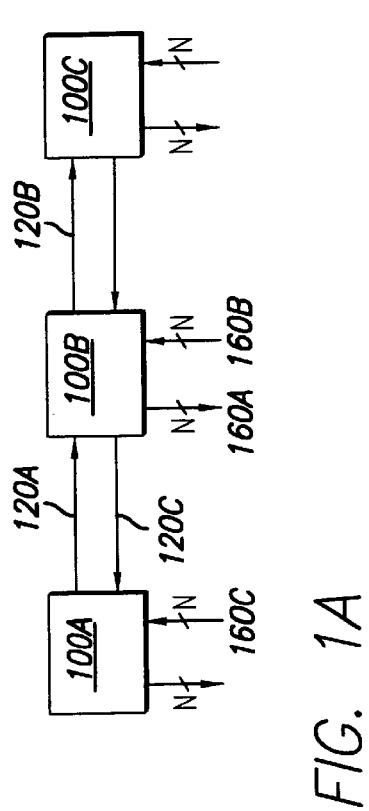
Figure 1B:
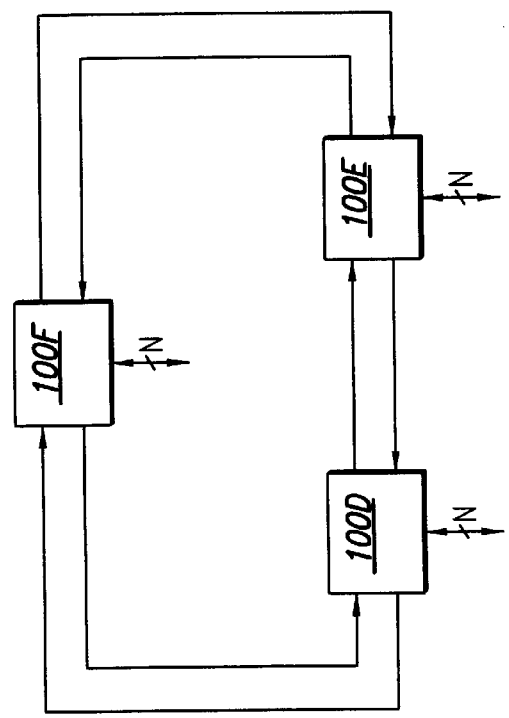

FIGS. 1A–1C are block diagrams of example optical communication networks including the present invention. Each of these networks includes a number of nodes 100A–100I (collectively or generically, nodes 100) which are coupled to each other by optical fibers in various configurations. The nodes 100 transmit high speed data signals to each over the optical fibers. The signals shall be referred to as high-speed channels 120 and are depicted by the arrows entering and exiting the sides of each node 100. Each node 100 also receive and transmits multiple lower speed data signals to other devices (not shown) via any number of communications channels, including branch fibers, metal conductors, and wireless channels. For convenience, these lower speed data signals shall be referred to as tributaries 160 and are represented by the slashed arrows entering and exiting the bottom of each node 100, the slash indicating there are multiple signals. In addition to transmitting high-speed channels 120 to other nodes, each node 100 also implements some ADM functionality to allow the addition of incoming tributaries 160B to outgoing high-speed channels 120 and to allow the extraction of tributaries 160A from incoming high-speed channels 120. It is impractical to describe all possible ADM functionalities, but the following examples will describe the more basic functionalities.

In FIG. 1A, node 100A is coupled to node 100B to node 100C to form a bidirectional linear chain, bidirectional meaning that there are high-speed channels 120 running in both directions along the chain. Node 100B receives incoming high-speed channel 120A from node 100A. This channel 120A is the combination of a number of tributaries, some of which may have node 100B as their final destination. These tributaries are extracted, or "dropped," from high-speed channel 120A and exit node 100B via the outgoing tributaries. The remaining tributaries in high-speed channel 120A presumably are destined for node 100C and, therefore, are "passed through" node 100B to form part of high-speed channel 120B traveling to node 100C. Some of the incoming tributaries 160B may also be destined for node 100C. These are "added" by node 100B to high-speed channel 120B. This example illustrates the basic ADM functions of add, drop, and pass-through.

More advanced ADM functions include broadcast, multicast, and drop-and-continue. As an example of multicast, one of the tributaries 160B may be destined for multiple destinations including both nodes 100A and 100C. To implement the multicast function, the incoming tributary 160B would be added to low-speed slots on both the high-speed channel 120B traveling to node 100C and on the high-speed channel 120C traveling to node 100A.

Alternatively, the tributary 160B can be added to two low-speed slots on high-speed channel 120B. In the broadcast situation, a single incoming low-speed channel is dropped to multiple tributaries. For example, node 100B may drop an incoming low-speed channel on an incoming high-speed channel 120A to several of the tributaries 160A. In drop-and-continue, a low-speed channel on an incoming high-speed channel is both dropped and passed through. For example, if one of the incoming tributaries 160C were destined for both nodes 100B and 100C, node 100A would first add that tributary 160C to a low-speed slot in the high-speed channel 120A. Node 120B would drop the corresponding low-speed channel from high-speed channel 120A to tributary 160A but would also pass the low-speed channel through to high-speed channel 120B destined for node 100C, thus implementing a drop-and-continue.

The above functions are merely examples of ADM functionality which may be implemented by nodes 100. In general, it is desirable for nodes 100 to be able to route any incoming data signal(s), whether received from an incoming tributary 160 or as part of an incoming high-speed channel 120, to any outgoing data signal(s), whether transmitted as an outgoing tributary 160 or as part of an outgoing high-speed channel 120. Implementing more of this general functionality in a node 100 will result in a more flexible node 100 which can be used in any number of network configurations for any number of purposes.

FIG. 1B is an example of a ring network using nodes 100D–100F. These nodes 100 are coupled by two high-speed channels, one forming a clockwise ring and the other forming a counterclockwise ring, for example for redundancy purposes. To continuously take advantage of this redundancy, tributaries entering the high-speed ring may be broadcast in both directions around the ring. Alternately, one ring may be used as the primary direction while the other is reserved strictly for failure of the primary ring. In this case, when failure of the primary ring is detected, all traffic is re-routed to the redundant ring. As a variant of this, traffic may be intentionally re-routed to the redundant ring to allow, for example, an additional node to be added to the primary ring. After the installation, traffic is returned to the primary ring. All of these situations require that the nodes 100 be able to implement certain ADM functionalities.

Other network configurations will be apparent. For example, if the linear chain only contained two nodes 100, it typically would be referred to as a point-to-point connection rather than a linear chain. FIG. 1C is an example of a ring-to-ring configuration. Nodes 100G and 100H are coupled to form one ring; while nodes 100H and 100I are coupled to form another ring. Node 100H, through its ADM functionality, couples the two rings together since, for example, a low-speed channel received as part of high-speed channel 120D may be passed through to high-speed channel 120E.

Figure 2:
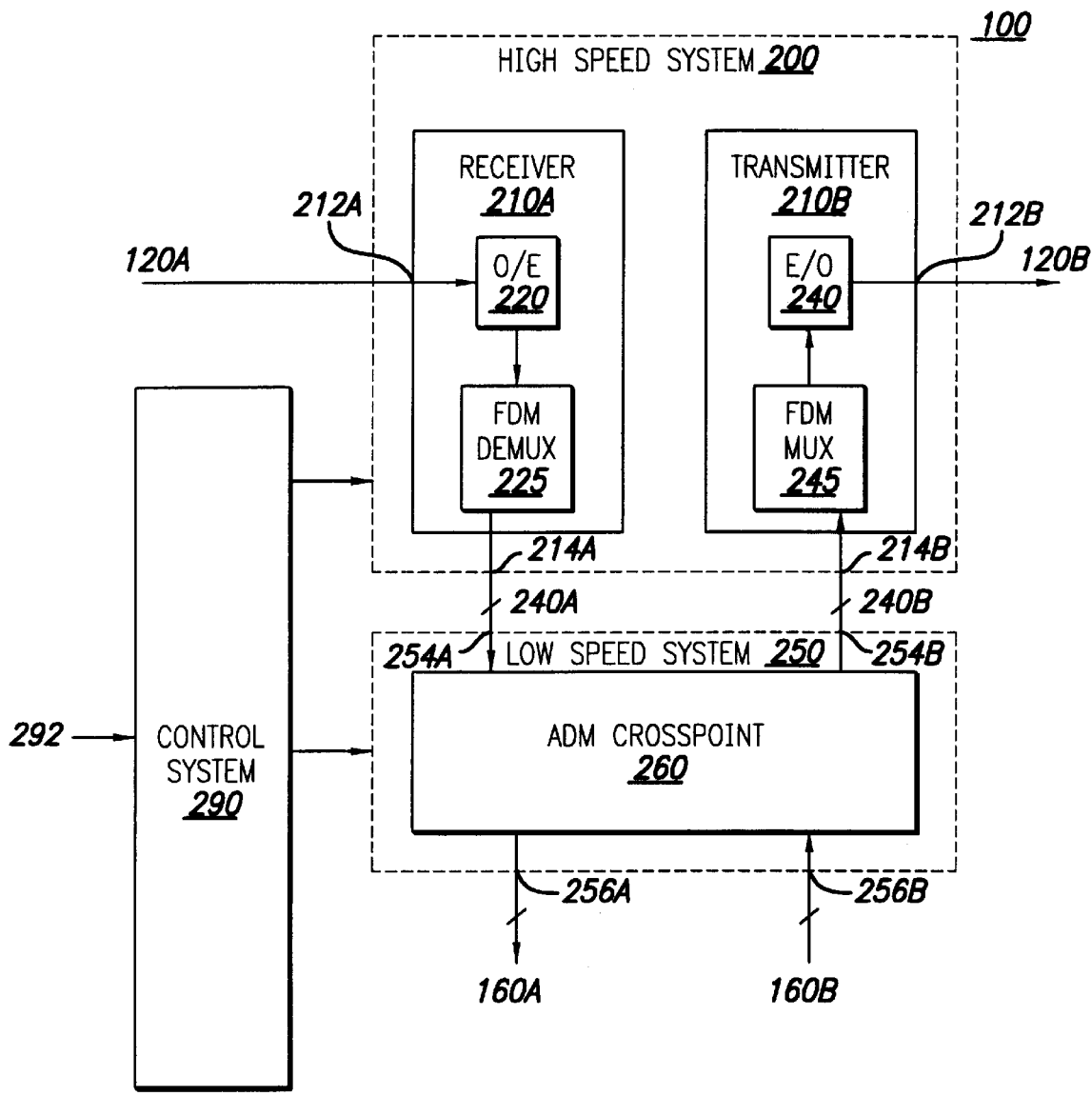
FIG. 2 is a block diagram of an FDM node 100 in accordance with the present invention.

FIG. 2 is a block diagram of a node 100 in accordance with the present invention. For reasons which shall become apparent, node 100 shall be referred to as an FDM node 100. The FDM node 100 includes a high-speed receiver 210A and a high-speed transmitter 210B (collectively, the high-speed system 200), and further includes a low-speed system 250 and a control system 290. As used herein, the terms "receive" and "transmit" are with respect to the high-speed channels 120. In other words, "receive" refers to the data direction from an incoming high-speed channel 120A to an outgoing tributary 160A; while "transmit" refers to the data direction from an incoming tributary 160B to an outgoing high-speed channel 120B. In general, the suffixes A and B will be used to denote the receive and transmit directions, respectively, for data signals and input/output ports.

The high-speed receiver 210A includes an optical-to-electrical (O/E) converter 220 and a frequency division demultiplexer 225, which are coupled to form a data path as follows. A high-speed input 212A for the receiver 210A is coupled to the O/E converter 220 to the frequency division demultiplexer 225 to a plurality of low-speed outputs 214A for receiver 210A. The O/E converter 220, preferably a detector such as a high-speed PIN diode, converts an incoming signal from optical to electrical form. The frequency division demultiplexer 225 frequency division demultiplexes an incoming signal into a plurality of signals. Overall, the high-speed receiver 210A converts an incoming optical high-speed channel 120A into a plurality of electrical low-speed channels 240A.

The high-speed transmitter 210B implements the reverse function of the high-speed receiver 210A, converting a plurality of incoming low-speed channels 240B into an outgoing optical high-speed channel 120B. The transmitter 210B includes a frequency division multiplexer 245 for frequency division multiplexing a plurality of signals into a single signal, and an E/O converter 240 for converting signals from electrical to optical form. The E/O converter 240 preferably is an optical modulator, such as a Mach Zender modulator, which modulates an optical carrier with an incoming electrical signal. The data path in transmitter 210B runs from low-speed inputs 214B to frequency division multiplexer 245 to E/O converter 240 to high-speed output 212B.

The low-speed system 250 includes a crosspoint switch 260, which shall be referred to as an ADM crosspoint 260 since it implements the ADM functionality of node 100. The ADM crosspoint 260 couples its inputs to its outputs and may be dynamically reconfigured to implement any of a number of couplings between its inputs and outputs. In other words, the ADM crosspoint 260 switchably couples its inputs to its outputs. The crosspoint 260 preferably is non-blocking and capable of coupling any of its inputs to any of its outputs, including to multiple outputs simultaneously.

The low-speed system 250 includes a plurality of low-speed inputs 254A coupled to the low-speed outputs 214A of the high-speed receiver 210A to transmit low-speed channels 240A, and a plurality of low-speed outputs 254B coupled to the low-speed inputs 214B of the high-speed transmitter 210B to transmit low-speed channels 240B. The low-speed system 250 further includes a plurality of tributary outputs 256A and tributary inputs 256B for transmitting and receiving tributaries 160A and 160B, respectively.

ADM crosspoint 260 has these same inputs and outputs coupled in the same fashion. It should be noted that the different names for the various inputs and outputs to ADM crosspoint 260 are selected to reflect differences in the couplings of these inputs and outputs but do not necessarily reflect structural differences in the input and output ports of the ADM crosspoint 260. In other words, most crosspoints 260 simply have a number of input ports and a number of output ports, all of which are identical. Hence, the terms "low-speed input 254A" and "tributary input 256B" are selected because these are crosspoint inputs for low-speed channels 240A and tributaries 160B, respectively, and not because there is necessarily some structural difference in these input ports on crosspoint 260.

Control system 290 is coupled to both the high-speed system 200 and the low-speed system 250 and generates the controls for node 100. Control system 290 also has an external port 292 to allow external control of node 100. For example, an external network management system may manage a large fiber network, including node 100. Alternately, a technician may connect a craft terminal to external port 292 to allow local control of node 100, as may be desirable during troubleshooting.

Figure 3:
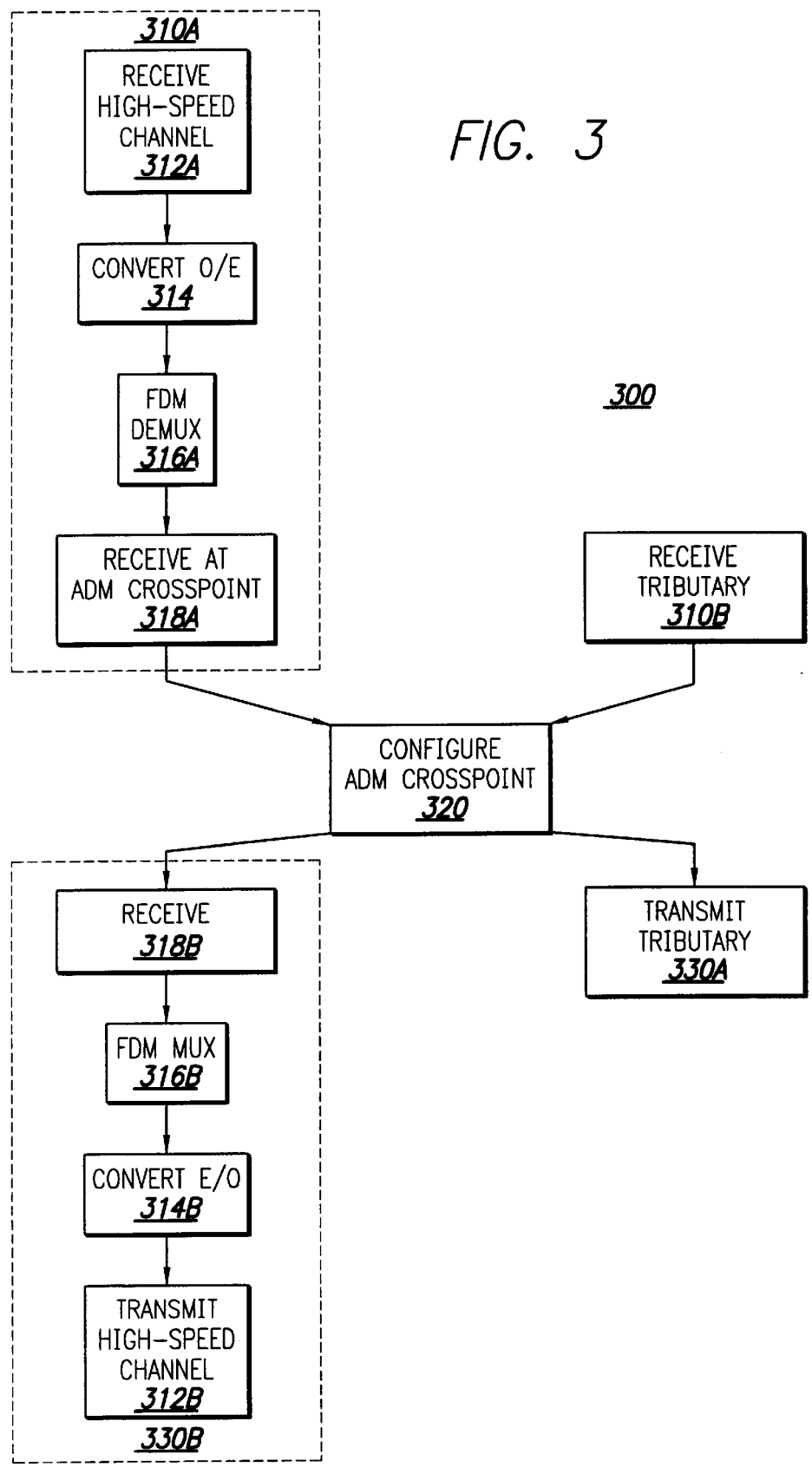
FIG. 3 is a composite flow diagram illustrating add, drop, and pass-through functions using FDM node 100.

FIG. 3 is a composite flow diagram illustrating add, drop, and pass-through functions 300 using FDM node 100. As mentioned previously, FDM node 100 can implement many different ADM functionalities, only a representative sampling of which will be explained for reasons of conciseness. The invention is not limited to these examples.

Method 300 has three basic steps. The ADM crosspoint 260 receives 310 a low speed data signal, either from a high-speed channel 120A (branch 310A) or from a tributary 160B (branch 310B). The control system 190 configures 320 the ADM crosspoint to route the incoming data signal to the appropriate output 160A or 254B. From this output, the signal is transmitted 330 on its way, either as part of an outgoing high-speed channel 120B (branch 330B) or an outgoing tributary 160A (branch 330A). Now consider each of the receive 310 and transmit 330 steps in turn.

Step 330B is performed by the high-speed transmitter 210B. Low-speed channels 240B from the ADM crosspoint 260 are received 318B at low-speed inputs 214B of the transmitter 210B. The frequency division multiplexer 245 combines these signals into a high-speed channel using standard frequency division multiplexing 316B techniques. Typically, each low-speed channel 240B is modulated on a carrier frequency distinct from all other carrier frequencies. These modulated carriers are then combined to form a single electrical high-speed channel, typically an RF signal. E/O converter 240 converts 314B the electrical high-speed channel (i.e., the RF signal in the preferred embodiment) to optical form, preferably via an optical modulator. The optical high-speed channel 120B is transmitted 312B to the next node via high-speed output 212B.

Step 310A is the reverse of step 330B and is performed by the high-speed receiver 210A. An incoming optical high-speed channel 120A, such as that produced in step 330B, is received 312A at high-speed input 212A. O/E converter 220 converts 314A the optical high-speed channel 120A to an electrical high-speed channel, typically an RF signal. This electrical high-speed channel includes a number of low-speed channels which were combined by frequency division multiplexing. Frequency division demultiplexer 225 frequency division demultiplexes 316A the high-speed signal, using standard techniques, to recover the plurality of low-speed channels 240A, which are received 318A by crosspoint 260 at its low-speed inputs 254A.

Steps 310B and 330A are relatively simpler since the tributaries 160 are already low-speed signals and need not necessarily be converted to/from high-speed formats. In particular, in step 310B, the ADM crosspoint 260 receives a tributary 160B at the crosspoint's tributary input 256B. In step 330A, the ADM crosspoint 260 transmits a tributary 160A from its tributary output 256A.

In step 320, the control system 290 configures the ADM crosspoint 260 according to the desired functionality. For example, to implement the "add" functionality, a tributary 160B is received according to step 310B, the crosspoint 260 is configured 320 to couple the relevant tributary input 256B to the relevant low-speed output 254B, and the low-speed channel 240B is output according to step 330B. For the "drop" functionality, steps 310A and 330A are the relevant input and output steps, and the crosspoint 260 is configured 320 to couple the relevant low-speed input 254A to the relevant tributary output 256A. For "pass-through" functionality, data is received according to step 310A, the crosspoint 260 is configured 320 to couple the relevant low-speed input 254A to the relevant low-speed output 254B, and the data is transmitted according to step 330B.

The use of frequency division multiplexing in the high-speed system 200 allows the transport of a large number of low-speed tributaries 160 over a single fiber in a spectrally-efficient manner. It also reduces the cost of high-speed system 200 since the bulk of the processing performed by high-speed system 200 is performed on low-speed electrical signals. In contrast, the relatively spectrally-inefficient modulation schemes used by WDM and TDM systems necessitate the use of larger bandwidths, which leads to larger dispersion and non-linear effects and the use of higher-speed electronics, which typically leads to higher costs. Furthermore, since the high-speed channels 120 can efficiently and cost effectively be converted to low-speed channels 240, the add/drop functionality can be implemented electrically and, in particular, the use of crosspoint 260 allows the implementation of a broad range of add/drop functionality, including functions such as multicasting, broadcasting, and drop-and-continue. This, in turn, leads to a flexible node 100 which may be used in many different network configurations and which facilitates the implementation of system redundancies and the servicing of nodes 100 with minimal disturbance to in-service traffic. Furthermore, since the crosspoint 260 is completely non-blocking and flow-through, data is neither timed nor stored. As a result, the same ADM crosspoint 260 may be used for a wide variety of bit rates, data formats, and protocols.

Figure 4:
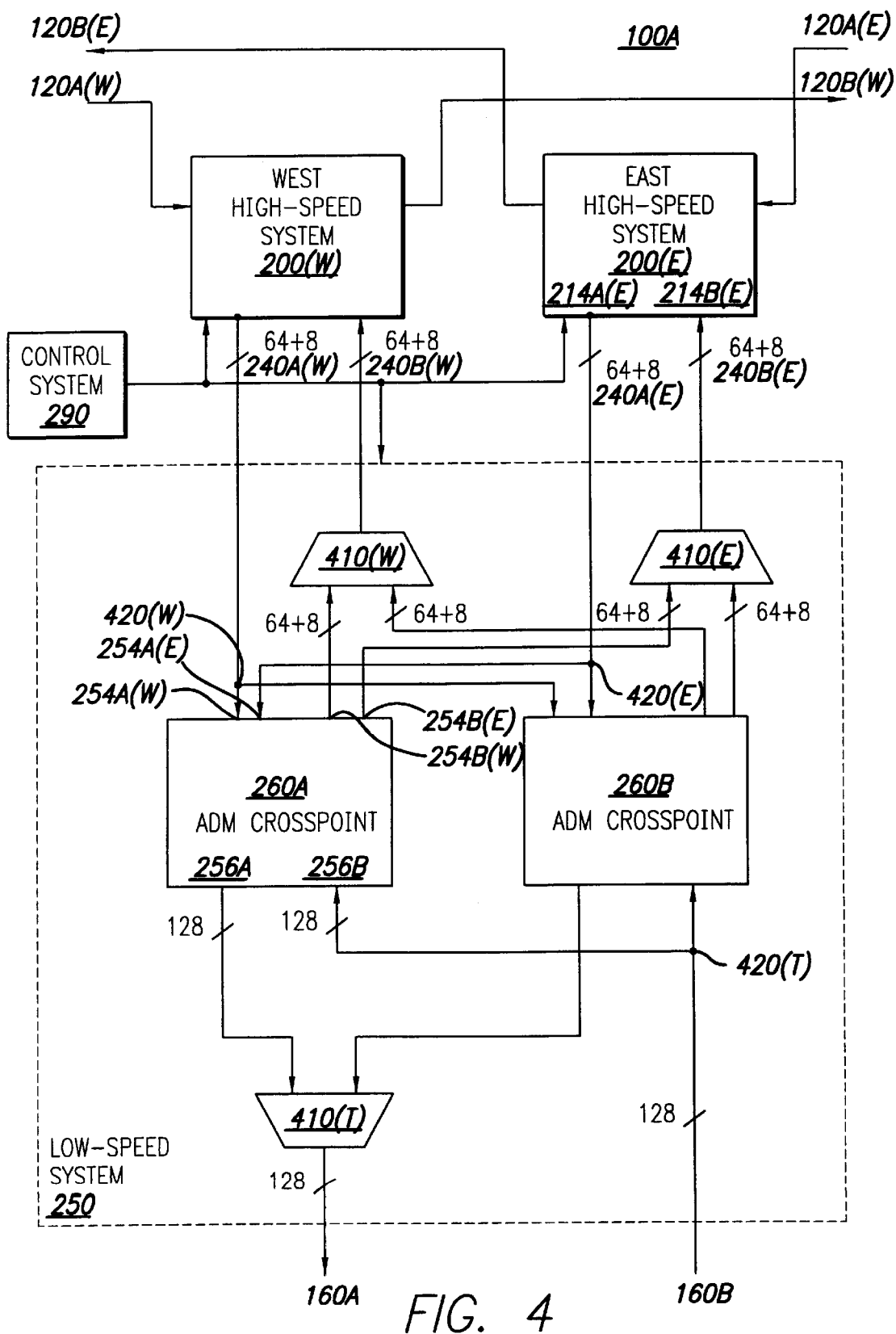
FIG. 4 is a block diagram of a preferred embodiment of FDM node 100.
Figure 5:
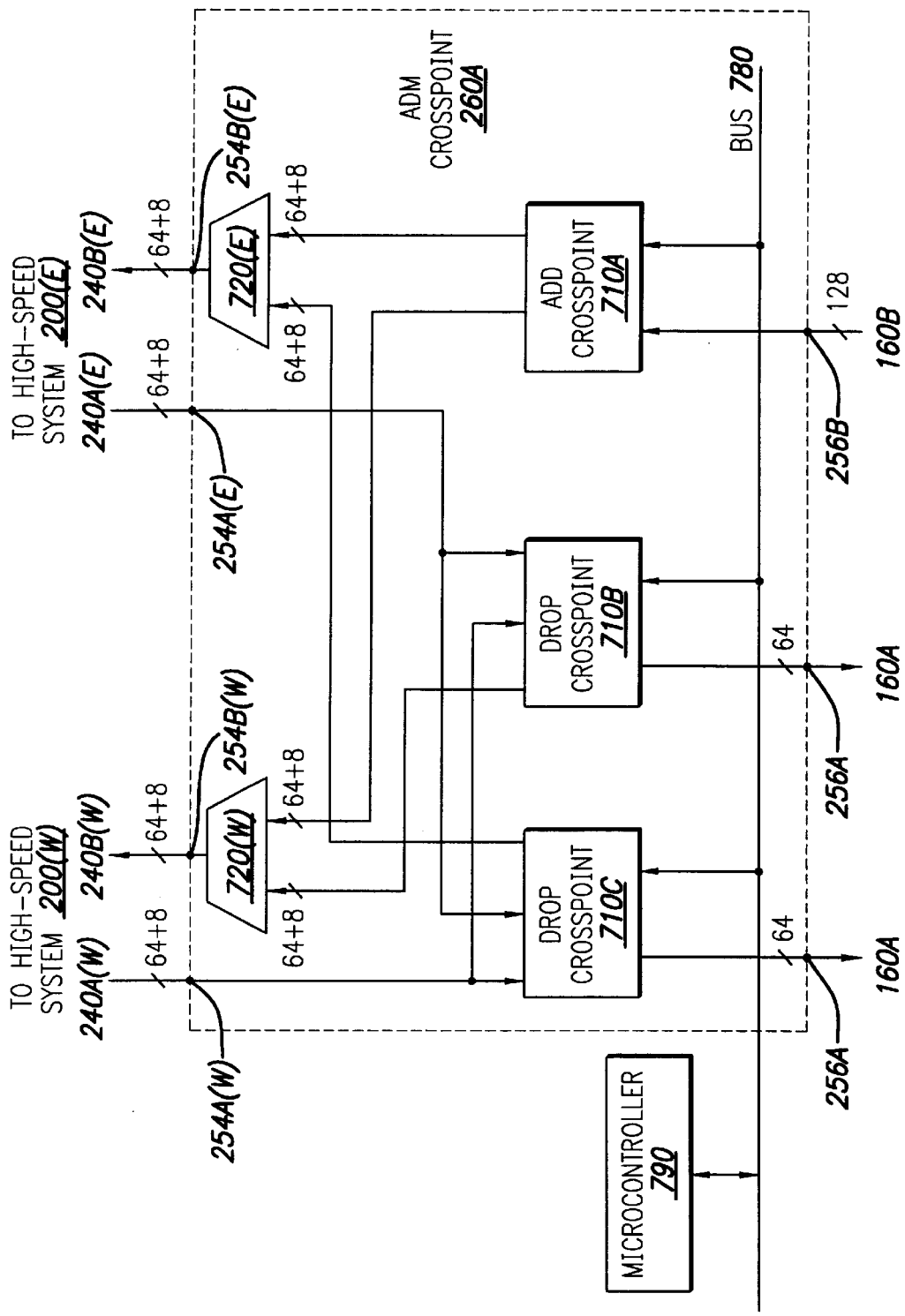
FIG. 5 is a block diagram of a preferred embodiment of ADM crosspoint 260A.

FIGS. 4 and 5 are block diagrams of a preferred embodiment of FDM node 100A, which consists of two high-speed systems 200(E) and 200(W) and one low-speed system 250. Other embodiments may have different numbers of high-speed systems 200 and/or low-speed systems 250 or could include only the high-speed receiver 210A or the high-speed transmitter 210B, rather than both as shown in FDM node 100 of FIG. 2. Alternately, multiple high-speed channels 120 could be coupled to a single high-speed system 200. For example, rather than having separate high-speed systems 200(W) and 200(E) to facilitate high-speed channels 120 coming from different nodes, a single high-speed system 200 could be used to receive both high-speed channels 120A(W) and 120A(E) and to transmit both high-speed channels 120B(W) and 120B(E). Alternate embodiments for portions of FDM node 100 are discussed at length in the High-Speed System Application, the teachings of which are incorporated herein by reference. For example, receiver 106 and transmitter 102 in the High-Speed System Application correspond to the high-speed receiver 210A and transmitter 210B of this description, respectively.

FIG. 4 is a block diagram of a preferred embodiment 100A of an FDM node. Node 100A includes two high-speed systems 200(E) and 200(W), a low-speed system 250, and a control system 290. The high-speed systems 200(E) and 200(W) are the same as each other, but two systems are used in order to facilitate flow to two other nodes (not shown) which are arbitrarily referred to as an east and a west node. The suffixes E and W denote high-speed channels arriving from the east and west nodes, respectively. In the eastbound direction, high-speed system 200(E) has incoming and outgoing high-speed channels 120A(E) and 120B(E) and is coupled to low-speed system 250 via low-speed inputs and outputs 214B(E) and 214A(E), respectively. West high-speed system 200(W) is analogously coupled.

In this preferred embodiment, each of the four high-speed channels 120 carries 10 Gbps, which is equivalent in data capacity to an OC-192 data stream. Each low-speed channel 240 and tributary 160 is a 155 Mbps electrical signal (equivalent in capacity to an OC-3 signal), allowing 64 low-speed channels 240 and/or tributaries 160 to be included in each high-speed channel 120. There are 128 incoming and outgoing tributaries 160B and 160A, respectively, as indicated by the notation "128" located adjacent to the slashes across lines 160B and 160A. Hence, FDM node 100A has enough capacity to place every incoming tributary 160B onto an outgoing high-speed channel 120B(E) or 120B(W) and also has enough capacity to drop incoming high-speed channels 120A(E) and 120A(W) in their entirety to outgoing tributaries 160A. Consistent with these figures, each high-speed system 200(E) and 200(W) can support 64 incoming and outgoing low-speed channels 240B and 240A, as denoted by the "64" in the notation "64+8" located adjacent to the slashes across lines 240B and 240A. The "+8" in the notation "64+8" indicates that there are 8 additional lines used for redundancy purposes. For purposes of clarity, the basic operation of FDM node 100A will be described first, with the redundancy aspects described afterwards.

Each high-speed system 200 converts between the low-speed channels 240 and high-speed channels 120 and is structured similarly to the high-speed system 200 in FIG. 2. In particular, in the transmit direction, the 64 incoming low-speed channels 240B are digital data streams, each of which is used to modulate a carrier of a different frequency. The frequency division multiplexer 245 combines these different modulated signals into a single electrical high-speed channel using conventional frequency division multiplexing techniques. In a preferred approach, the frequency division multiplexer 245 accomplishes this in two successive stages. In the first stage, the low-speed channels 240B are divided into groups of channels, for example, eight groups of eight channels each. Within each group, each low-speed channel 240B modulates a carrier of a different frequency and all eight modulated carriers are frequency division multiplexed to form a single intermediate frequency (IF) signal containing all eight lows-peed channels. The eight IF signals are then frequency division multiplexed in the second stage to form the RF electrical high-speed channel.

In the receive direction, high-speed system 200 operates analogously. In particular, the frequency division demultiplexer 225 receives the RF electrical high-speed channel and frequency division demultiplexes it into its 64 constituent baseband analog signals. The demultiplexer 225 typically accomplishes this by splitting the electrical high-speed channel into a number of identical signals, each of which is downconverted and bandpass filtered to obtain one of the frequency components in the high-speed channel. As with frequency division multiplexing in the transmit direction, this frequency division demultiplexing may be accomplished in multiple stages. The resulting frequency components are baseband analog signals, which are demodulated to produce a plurality of baseband digital signals, which are the low-speed channels 240A.

The low-speed system 250 includes two ADM crosspoints 260A–260B, one of which is fully redundant. For the moment, consider only crosspoint 260A, which is coupled in the same manner as ADM crosspoint 260 in FIG. 2. In particular, the low-speed inputs 254A are coupled to the low-speed outputs 214A of the high-speed shelves 200 and can accommodate a total of 128+16 incoming low-speed channels 240A, 64+8 from each high-speed system 200. The low-speed outputs 254B are coupled to the low-speed inputs 214B of the high-speed shelves 200 and can produce a total of 128+16 low-speed channels 240B, 64+8 for each of the high-speed shelves 200. The tributary inputs and outputs 256B and 256A, respectively, can each handle 128 tributaries. Redundant crosspoint 260B is coupled in the same manner, thus supporting full redundancy. Various multiplexers 410(W), 410(E), and 410(T), and signal splitters 420(W), 420(E), and 420(T) are used to implement the parallel couplings to crosspoints 260A and 260B.

Embodiment 100A will be used to illustrate various aspects of the invention, but the invention is not limited to this specific example. For example, alternate embodiments can vary the number, bit rate, format, and protocol of the high-speed channels 120, low-speed channels 240, and tributaries 160. One advantage of FDM node 100 is that the system architecture is generally independent of these parameters. For example, the tributaries 160 can comprise eight 2.5 Gbps data streams, 32 622 Mbps data streams, 128 155 Mbps data streams as in this embodiment, 384 51.84 Mbps data streams, or any intermediate bit rate, or any combinations of bit rates, without requiring major changes to the architecture of FDM node 100. Furthermore, O/E and E/O converters may be included in low-speed system 250 to convert the tributaries 160 between optical and electrical form, thus supporting optical protocols such as SONET for the tributaries 160.

FIG. 5 is a block diagram of a preferred embodiment of ADM crosspoint 260A. Crosspoint 260A includes three crosspoint chips 710A–C. Chips 7101B–C implement the drop and pass-through functions; while chip 710A implements the add function. In an alternative embodiment, the drop and pass-through functions are implemented by separate chips. However, in the preferred embodiment, if one of chips 710B–C fails, the system can continue to perform both drop and pass-through functions with the other chip 710B–C. Crosspoint 260A also includes two multiplexers 720(E) and 720(W). The output of each multiplexer 720 is coupled to the respective low-speed outputs 254B(E) and 254B(W), for transmitting low-speed channels 240B to the respective high-speed systems 200. The multiplexers 720 receive their inputs from various of the crosspoint chips 710. The three crosspoint chips 710 are coupled as follows. Add crosspoint chip 710A receives 128 tributaries 160B via tributary inputs 256B and transmits outgoing low-speed channels to the multiplexers 720, 64+8 each to each of multiplexers 720(E) and 720(W). Each of the drop crosspoint chips 710B–C receives 64+8 incoming low-speed channels 240A from each of the low-speed inputs 254A(E) and 254A(W), for a total of 128+16 incoming low-speed channels 240A to each chip 710B–C. Chip 710B is also coupled to multiplexer 720(W) and to 64 of the outgoing tributaries 160A, thus providing pass-through function to the west high-speed system 200(W) and drop functionality to half of the 128 outgoing tributaries 160A. Chip 710C is coupled to multiplexer 720(E) and the remaining 64 of the outgoing tributaries 160A, thus providing pass-through function to the east high-speed system 200(E) and drop functionality to the other half of the 128 outgoing tributaries 160A. The control system 290 includes a microcontroller 790, which communicates with the three crosspoints 710 via bus 780.

In this preferred embodiment, each crosspoint chip 710 is a configurable electrical crosspoint matrix switch (manufacturer I-Cube, part number IQX320). The IQX320 is an SRAM-based bit-oriented switching device. It has a total of 320 ports, each of which may serve as either an input or output, and can connect any port to any number of other ports, within the fanout of the input signal. The switch is not timed and does not have buffers. In essence, it is a dynamically reconfigurable device which can switchably couple any port to any other port. The IQX320 operates with single ended signals at TTL voltage levels, so low voltage differential signaling (LVDS) receivers and drivers interface the IQX320 with the low-speed channels 240 and tributaries 160, which are differential 155 Mbps electrical signals in this preferred embodiment.

To operate the IQX320, the ports of interest are first configured to be either inputs or outputs, as applicable. Then, the IQX320 is configured to couple the relevant inputs to the relevant outputs by switching the relevant SRAM cells. The IQX320 is structured such that the row address of the relevant SRAM cell corresponds to the port number of the desired output and the column address corresponds to the port number of the desired input. The IQX320 can be reconfigured in real-time.

In ADM crosspoint 260A, each of the crosspoint chips 710 is configured by microcontroller 790 via bus 780. Microcontroller 790, in turn, may receive its commands from a number of sources. For example, external commands may be received from a network management processor or craft terminal, as described previously. Alternately, routing information may be obtained from the headers of the incoming data (e.g., the data communications channel fields in SONET headers). In this case, FDM node 100A may include buffers in order to buffer the incoming data while the crosspoints 710 are reconfigured. FDM node 100A may further include a routing table to convert the received routing information into the appropriate configuration for crosspoints 710.

FDM node 100A operates according to method 300 described previously. For the drop and pass-through functions, drop crosspoint chips 710B–C receive 310A the low speed channel of interest 240A from either high-speed channel 120A(W) or 120A(E). In the case of drop, the microcontroller 790 configures 320 the appropriate crosspoint chip 710B–C to couple the received low-speed channel 240A to the appropriate outgoing tributary 160A. In the case of pass-through, the appropriate crosspoint chip 710B–C and corresponding multiplexer 720(W)–720(E) are configured 320 to route the low-speed channel 240A to the appropriate outgoing low-speed channel 240B. For the add function, the add crosspoint chip 710A receives 310B an incoming tributary 160B. The microcontroller 790 configures 320 the chip 710A and corresponding multiplexer 720(W) and 720(E) to couple the incoming tributary 160B to the appropriate outgoing high-speed channel 120B. The ability to reconfigure crosspoints 710 in real-time enhances the flexibility and reliability of the overall network. For example, as FDM node 100A is used in different network configurations or as the traffic pattern through node 100A varies, the ADM functionality required of FDM node 100A may also vary. In node 100A, microcontroller 790 simply reconfigures crosspoint 710 to meet the new configuration requirement.

As another example, node 100A has built-in redundancy which is implemented in part because the crosspoints 710 are easily reconfigurable. For example, the incoming eastbound low-speed channels 240A(E) include 64+8 channels. These channels 240A(E) may be generated by 8+1 different cards in the high-speed system 200, with each card generating 8 of the low-speed channels 240A(E). If one of the cards fails, control system 290 re-routes traffic to the redundant card, with microcontroller 790 reconfiguring the crosspoints 710 to account for this re-routing. FDM node 100A remains functional while the failed card is replaced. The two ADM crosspoints 260A–B are also fully redundant. If ADM crosspoint 260A is the primary crosspoint, then multiplexers 410 will normally be configured to route traffic to/from ADM crosspoint 260A. However, if ADM crosspoint 260A fails, microcontroller 790 reconfigures multiplexers 410 to route traffic to/from redundant ADM crosspoint 260B instead.

In ADM crosspoint 260A, the basic ADM functionality is divided among three separate crosspoint chips 710, with two chips implementing the drop and pass-through functions while the third implements the add function. Other divisions of the ADM functionality will be apparent. For example, the entire functionality may be implemented in a single chip of sufficient size, also eliminating the use of multiplexers 720. Alternately, if a large number of input and output data signals are to be accommodated, a large number of separate devices may be required just to accommodate the number of data signals. In other words, the ADM functionality may be divided among a number of devices simply because a single device is not large enough to implement the entire functionality. As another example, additional splitters may be used to increase the input fanout. For example, if an incoming tributary 160B coupled to the ADM crosspoint 260 is limited to a fanout of 8 but a larger fanout is desired, the tributary 160B may be coupled to a 1:4 splitter, each output of which is coupled to the ADM crosspoint 260. This would support a total fanout of 32, 8 for each of the 4 splitter outputs.

It should be noted that the embodiments described above are exemplary only and many other alternatives will be apparent. For example, in preferred embodiment 100A of FIG. 4, the tributaries 160 and low-speed channels 240 were digital signals, and the ADM crosspoints 260 implemented the add/drop functionality on these digital signals. In the transmit direction, the high-speed system 200 modulates a carrier with the digital low-speed channels 240B, producing an analog signal; while in the receive direction, the high-speed system 200 demodulates the received analog signal to produce the digital low-speed channels 240A. In an alternate embodiment, the modulation/demodulation occurs on the tributary side of the ADM crosspoint 260 rather than on the high-speed system side. In this embodiment, the low-speed channels 240 and tributaries 160 are analog signals, and the ADM crosspoint 260 implements the add/drop functionality on these analog signals. In the transmit direction, an incoming digital stream would first modulate a carrier to produce an analog tributary 160B, possibly at baseband. This analog tributary 160B would then enter the ADM crosspoint 260 to be add/dropped. Similarly, in the receive direction, incoming analog low-speed channels 240 would first be add/dropped by ADM crosspoint 260 before being demodulated into the corresponding digital signal. One advantage of this approach is that no modulation/demodulation is required for channels which are passed-through a node.

In a variant of the above alternative, the analog low-speed channels 240 are sampled between the low-speed system 250 and the rest of the high-speed system 200. Hence, the low-speed channels 240A are digital signals, but are still modulated. This allows the ADM crosspoint 260 to implement the add/drop functionality on digital signals, while also preserving the advantage of not requiring any modulation/demodulation for channels which are being passed-through a node. The sampled signals are then modulated/demodulated, albeit digitally, on the tributary side of the ADM crosspoint 260.

As another example, the discussion of embodiment 100A noted that the frequency division multiplexing preferably was implemented in two stages: a first stage multiplexing low-speed channels into IF signals, and a second stage multiplexing the IF signals into the RF electrical high-speed channel. In embodiment 100A, the ADM crosspoint 260 was located after (or before, depending on the direction of data flow) both of these stages. In an alternate embodiment, the ADM crosspoint 260 is located between these two stages. In this case, the "low-speed channels" to the ADM crosspoint 260 are actually the IF signals and the ADM crosspoint 260 implements the add/drop functionality on these IF signals.

As yet another example, in the embodiments discussed above, the low-speed channels 240 were combined into an electrical high-speed channel using solely frequency division multiplexing. For example, in embodiment 100A of FIG. 4, each of the 64 low-speed channels 240B was effectively placed on a carrier of a different frequency and these 64 carriers were then effectively combined into a single electrical high-speed channel solely on the basis of the different carrier frequencies. This is not meant to imply that the invention is limited solely to frequency division multiplexing to the exclusion of all other approaches for combining signals. In fact, in alternate embodiments, other approaches may be used in conjunction with frequency division multiplexing. For example, in one approach, the 64 low-speed channels 240B of FIG. 4 may be combined into a single high-speed channel 120B in two stages, only the second of which is based on frequency division multiplexing. In particular, the 64 low-speed channels 240B are divided into 16 groups of 4 channels each. Within each group, the 4 channels are combined into a single signal using 16-QAM (quadrature amplitude modulation). The resulting QAM-modulated signals are frequency-division multiplexed to form the electrical high-speed channel.

As a final example, it should be clear that the tributaries 160 may themselves be combinations of signals. For example, some or all of the 155 Mbps tributaries 160 in embodiment 100A of FIG. 4 may be the result of combining several lower data rate signals, using either frequency division multiplexing or other techniques. In one approach, time division multiplexing may be used to combine several lower data rate signals into a single OC-3 (or STS3-signal, which serves as a tributary 160 for embodiment 100A.

Although the invention has been described in considerable detail with reference to certain preferred embodiments thereof, other embodiments are possible. Therefore, the scope of the appended claims should not be limited to the description of the preferred embodiments contained herein.

What is claimed is:

1. An FDM node for use in optical communications networks comprising:
   an O/E converter for converting a first optical high-speed channel to a first electrical high-speed channel;
   a frequency division demultiplexer coupled to the O/E converter for frequency division demultiplexing the first electrical high-speed channel into a first plurality of low-speed channels;
   an electrical ADM crosspoint having a plurality of low-speed inputs coupled to the frequency division demultiplexer, a plurality of low-speed outputs, a plurality of tributary inputs, and a plurality of tributary outputs, for switchably coupling the low-speed inputs and tributary inputs to the low-speed outputs and tributary outputs;
   a frequency division multiplexer coupled to the low-speed outputs of the ADM crosspoint for converting a second plurality of low-speed channels into a second electrical high-speed channel; and
   an E/O converter coupled to the frequency division multiplexer for converting the second electrical high-speed channel to a second optical high-speed channel.

2. The FDM node of claim 1 wherein the O/E converter comprises:
   a PIN diode for detecting an intensity of the first optical high-speed channel to produce the first electrical high-speed channel.

3. The FDM node of claim 1 wherein the E/O converter comprises:
   a Mach Zender modulator for modulating an optical carrier with the second electrical high-speed channel to produce the second optical high-speed channel.

4. The FDM node of claim 1 wherein the frequency division demultiplexer comprises:
   a first stage coupled to the O/E converter for frequency division demultiplexing the first electrical high-speed channel into a plurality of intermediate frequency (IF) signals; and
   a second stage coupled to the first stage for frequency division demultiplexing the plurality of IF signals into the first plurality of low-speed channels.

5. The FDM node of claim 1 wherein the frequency division multiplexer comprises:
   a first stage coupled to the low speed outputs of the ADM crosspoint for frequency division multiplexing the second plurality of low-speed channels into a plurality of intermediate frequency (IF) signals; and
   a second stage coupled to the first stage for frequency division multiplexing the plurality of IF signals into the second electrical high-speed channel.

6. The FDM node of claim 1 further comprising:
   a demodulator coupled between the frequency division demultiplexer and the low-speed inputs of the ADM crosspoint for demodulating the first plurality of low-speed channels; and
   a modulator coupled between the low-speed outputs of the ADM crosspoint and the frequency division multiplexer for modulating carriers with the second low-speed channels.

7. The FDM node of claim 1 wherein:
   the ADM crosspoint is further for simultaneously coupling one of the tributary inputs to at least two of the low-speed outputs.

8. The FDM node of claim 1 wherein:
   the ADM crosspoint is further for simultaneously coupling one of the low-speed inputs to at least two of the tributary outputs.

9. The FDM node of claim 1 wherein:
   the ADM crosspoint is further for simultaneously coupling one of the low-speed inputs to one of the tributary outputs and to one of the low-speed outputs.

10. The FDM node of claim 1 wherein:
    the ADM crosspoint is further for simultaneously coupling every low-speed input to a different one of the tributary outputs.

11. The FDM node of claim 1 wherein:
    the ADM crosspoint is further for simultaneously coupling every tributary input to a different one of the low-speed outputs.

12. The FDM node of claim 1 wherein:
    the ADM crosspoint is further for switchably coupling any low-speed input to any low-speed output, any low-speed input to any tributary output, and any tributary input to any low-speed output.

13. The FDM node of claim 1 wherein the ADM crosspoint comprises:
a plurality of crosspoint chips.

14. The FDM node of claim 1 wherein:
the first and second low-speed channels and first and second tributaries are digital signals; and
the ADM crosspoint is further for switchably coupling digital signals from the low-speed inputs and tributary inputs to the low-speed outputs and tributary outputs.

15. The FDM node of claim 1 wherein:
the first and second low-speed channels and first and second tributaries are analog signals; and
the ADM crosspoint is further for switchably coupling analog signals from the low-speed inputs and tributary inputs to the low-speed outputs and tributary outputs.

16. The FDM node of claim 1 further comprising:
a splitter coupled to at least two of the tributary inputs of the ADM crosspoint for splitting a data signal into at least two tributaries received at each of said tributary inputs.

17. The FDM node of claim 1 wherein:
the low-speed channels and tributaries are characterized by at least two different data rates.

18. The FDM node of claim 1 wherein:
the low-speed channels and tributaries are characterized by at least two different data communication protocols.

19. The FDM node of claim 1 further comprising:
a demodulator coupled to the tributary outputs of the ADM crosspoint for demodulating tributaries; and
a modulator coupled to the tributary inputs of the ADM crosspoint for modulating carriers with tributaries.

20. The FDM node of claim 1 further comprising:
an E/O converter coupled to the tributary outputs of the ADM crosspoint for converting tributaries from electrical to optical form; and
an O/E converter coupled to the tributary inputs of the ADM crosspoint for converting tributaries from optical to electrical form.

21. The FDM node of claim 1 further comprising:
a second O/E converter for converting a third optical high-speed channel to a third electrical high-speed channel;
a second frequency division demultiplexer coupled to the second O/E converter and to the low-speed inputs of the ADM crosspoint for frequency division demultiplexing the third electrical high-speed channel into a third plurality of low-speed channels;
a second frequency division multiplexer coupled to the low-speed outputs of the ADM crosspoint for converting a fourth plurality of low-speed channels into a fourth electrical high-speed channel; and
a second E/O converter coupled to the second frequency division multiplexer for converting the fourth electrical high-speed channel to a fourth optical high-speed channel.

22. The FDM node of claim 1 further comprising:
a control system for switching the couplings within the ADM crosspoint; and
a bus coupled to the control system and to the ADM crosspoint for supporting communication between the control system and the ADM crosspoint.

23. The FDM node of claim 1 further comprising:
a redundant electrical ADM crosspoint having a plurality of low-speed inputs coupled to the frequency division demultiplexer, a plurality of low-speed outputs coupled to the frequency division multiplexer, a plurality of tributary inputs, and a plurality of tributary outputs, for switchably coupling the low-speed inputs and tributary inputs to the low-speed outputs and tributary outputs.

24. The FDM node of claim 1 wherein:
the first and second low-speed channels comprise primary low-speed channels and redundant low-speed channels; and
the ADM crosspoint is further for switchably coupling data signals from a primary low-speed channel to a redundant low-speed channel responsive to failure of the primary low-speed channel.

25. In an FDM node comprising an electrical ADM crosspoint having a plurality of low-speed inputs, a plurality of low-speed outputs, a plurality of tributary inputs, and a plurality of tributary outputs, a method for dropping first tributaries from a first optical high-speed channel and for adding second tributaries to a second optical high-speed channel, the method comprising:
receiving the first optical high-speed channel;
converting the first optical high-speed channel to a first electrical high-speed channel;
frequency division de-multiplexing the first electrical high-speed channel into a plurality of first low-speed channels, wherein the first low-speed channels include first tributaries to be dropped from the first optical high-speed channel;
receiving the first low-speed channels containing the first tributaries at the low-speed inputs of the ADM crosspoint;
receiving second tributaries to be added to a second optical high-speed channel at the tributary inputs of the ADM crosspoint;
configuring the ADM crosspoint to couple said low-speed inputs to tributary outputs to produce the first tributaries at said tributary outputs and to couple said tributary inputs to low-speed outputs to produce second low-speed channels at said low-speed outputs;
frequency division multiplexing the second low-speed channels to produce a second electrical high-speed channel; and
converting the second electrical high-speed channel to a second optical high-speed channel.

26. The method of claim 25 wherein:
the step of frequency division de-multiplexing the first electrical high-speed channel comprises frequency division de-multiplexing the first electrical high-speed channel into a plurality of first low-speed channels, wherein the first low-speed channels further include third low-speed channels to be passed through from the first optical high-speed channel to the second optical high-speed channel;
the step of receiving the first low-speed channels further comprises receiving the first low-speed channels containing the third low-speed channels at the low-speed inputs of the ADM crosspoint;
the step of configuring the ADM crosspoint comprises configuring the ADM crosspoint to further couple the low-speed inputs receiving the third low-speed channels to low-speed outputs to produce fourth low-speed channels at said low-speed outputs; and
the step of frequency division multiplexing the second low-speed channels further comprises frequency division multiplexing the second and the fourth low-speed channels to produce the second electrical high-speed channel.

27. The method of claim 25 wherein the step of configuring the ADM crosspoint further comprises:

configuring the ADM crosspoint to simultaneously couple at least one of said tributary inputs to at least two of the low-speed outputs.

28. The method of claim 25 wherein the step of configuring the ADM crosspoint further comprises:

configuring the ADM crosspoint to simultaneously couple at least one of said low-speed inputs to at least two of the tributary outputs.

29. The method of claim 25 wherein the step of configuring the ADM crosspoint further comprises:

configuring the ADM crosspoint to simultaneously couple at least one of said low-speed inputs to one of the tributary outputs and to one of the low-speed outputs.

30. The method of claim 25 further comprising the steps of:

demodulating the frequency division demultiplexed first low-speed channels; and modulating carriers with the second low-speed channels.

31. The method of claim 25 further comprising the steps of:

demodulating the first tributaries; and modulating carriers with the second tributaries.

32. The method of claim 25 wherein:

the FDM node further comprises a redundant electrical ADM crosspoint having a plurality of low-speed inputs, a plurality of low-speed outputs, a plurality of tributary inputs, and a plurality of tributary outputs; and the method further comprises the step of:

responsive to failure of the ADM crosspoint, configuring the redundant ADM crosspoint to couple said low-speed inputs to tributary outputs to produce the first tributaries at said tributary outputs and to couple said tributary inputs to low-speed outputs to produce second low-speed channels at said low-speed outputs.

33. The method of claim 25 wherein:

the first and second low-speed channels comprise primary low-speed channels and redundant low-speed channels; and the step of configuring the ADM crosspoint further comprises configuring the ADM crosspoint to couple data signals from a primary low-speed channel to a redundant low-speed channel responsive to failure of the primary low-speed channel.

* * * * *